(No Model.)
W. A. FRIES.
WHEEL TIRE.
No. 593,931. Patented Nov. 16, 1897.
Fig. 1.
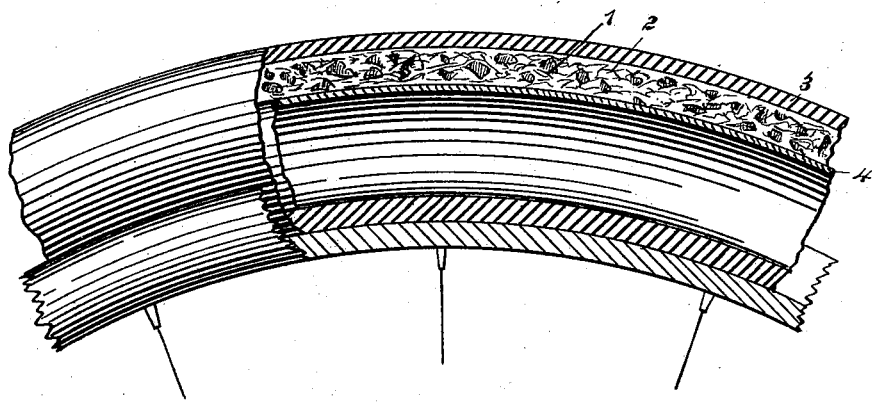
Fig. 2.  Fig. 3.  Fig. 4.
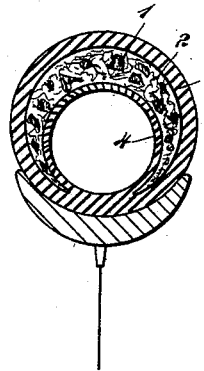 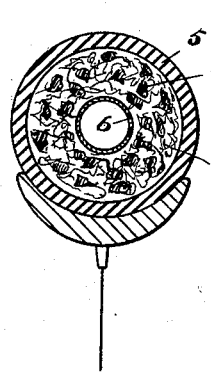 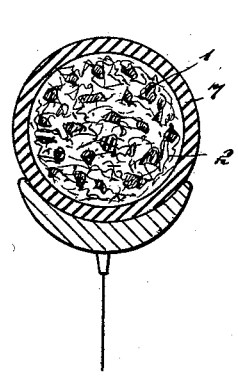
WITNESSES:
INVENTOR
W. A. Fries.
BY
ATTORNEYS.

UNITED STATES PATENT OFFICE.

WILLIAM A. FRIES, OF BROOKLYN, NEW YORK.

WHEEL-TIRE.

SPECIFICATION forming part of Letters Patent No. 593,931, dated November 16, 1897.

Application filed January 12, 1897. Serial No. 618,952. (No model.)

*To all whom it may concern:*

Be it known that I, WILLIAM A. FRIES, of Brooklyn, in the county of Kings and State of New York, have invented new and useful Improvements in Wheel-Tires, of which the following is a full, clear, and exact description.

This invention relates particularly to a filling for tubular rubber tires of bicycle or other vehicle wheels; and the object is to provide a light, flexible, and elastic filling that will overcome the trouble and annoyance incident upon the puncturing of the ordinary air-inflated tire.

I will describe a wheel-tire embodying my invention and then point out the novel features in the appended claim.

Reference is to be had to the accompanying drawings, forming a part of this specification, in which similar characters of reference indicate corresponding parts in all the views.

Figure 1 is a longitudinal section of a portion of a wheel-tire embodying my invention. Fig. 2 is a cross-section thereof. Fig. 3 is a cross-section showing a modification, and Fig. 4 is a cross-section showing another modification.

In carrying out my invention I employ comminuted cork 1, a binder 2 of fibrous material, and a flexible elastic uniting cement—such, for instance, as a rubber composition.

In Figs. 1 and 2 I have shown the filling as employed in an inflatable tire—that is, a tire comprising an outer rubber tube 3 and an interior inflating-tube 4. The filling in this tire will be sufficiently thick to prevent the puncturing of the inner tube by tacks, glass, or other substances.

In Fig. 3 I have shown the filling as made in the form of a tube arranged within a rubber outer tube 5. In this example the inner wall of the tubular filling may have a lining 6, of textile material, cemented to it. This construction of tire will secure lightness and yet sufficient rigidity and distention without air-inflation.

In the example shown in Fig. 4 the outer tube 7 is provided with a solid filling of the material embodying my invention. In this form it is obvious that the tire may be made smaller in diameter than in the other forms, thus providing the necessary lightness and strength.

As the major part of the above-described filling is cork, it will be very light, and as any refuse cork may be employed the cost will be very slight. The cork may be employed in the form of small blocks or in the form of shavings.

For a binding material I find that the dropping from cotton-carding has the required strength, and as this material may be obtained practically at the cost of labor for gathering I would recommend its use.

The rubber cement will hold the filling in a heterogeneous mass, and as but a small quantity of cement is required it will not add materially to the weight of the tire. In each example of my improvement the filling is to be cemented to the rubber tubing.

Having thus described my invention, I claim as new, and desire to secure by Letters Patent—

A wheel-tire, comprising a flexible outer tube, and a filling consisting of comminuted cork, a binder of carding droppings and a rubber cement, the said cork comprising the major portion of the filling, and the said filling being cemented to the tube, substantially as specified.

WILLIAM A. FRIES.

Witnesses:
ISAAC STRAUSS,
MORRIS L. COHEN.